Feb. 11, 1936. J. A. LAMONT 2,030,144
TRUCK
Filed July 21, 1931 2 Sheets-Sheet 1
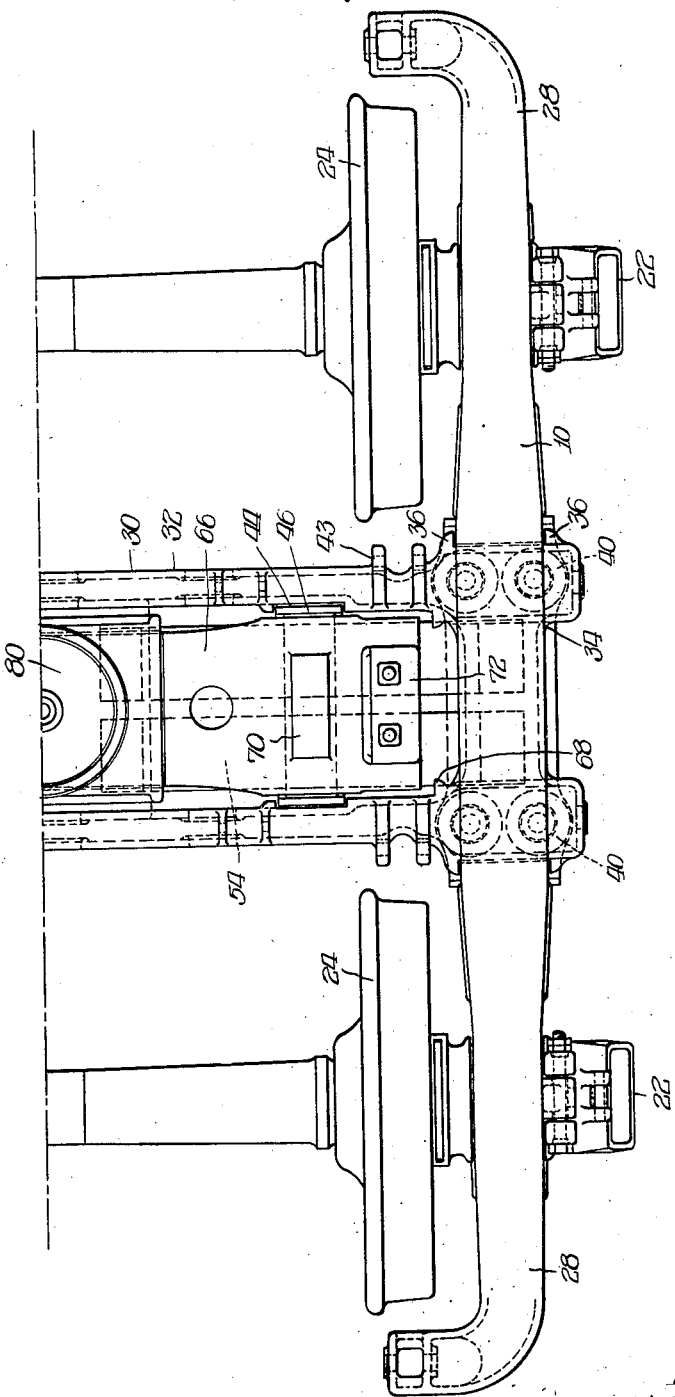
Inventor:
John A. Lamont,
By Wilkinson, Huxley, Byron & Knight
Attys Feb. 11, 1936. J. A. LAMONT 2,030,144
TRUCK
Filed July 21, 1931 2 Sheets-Sheet 2
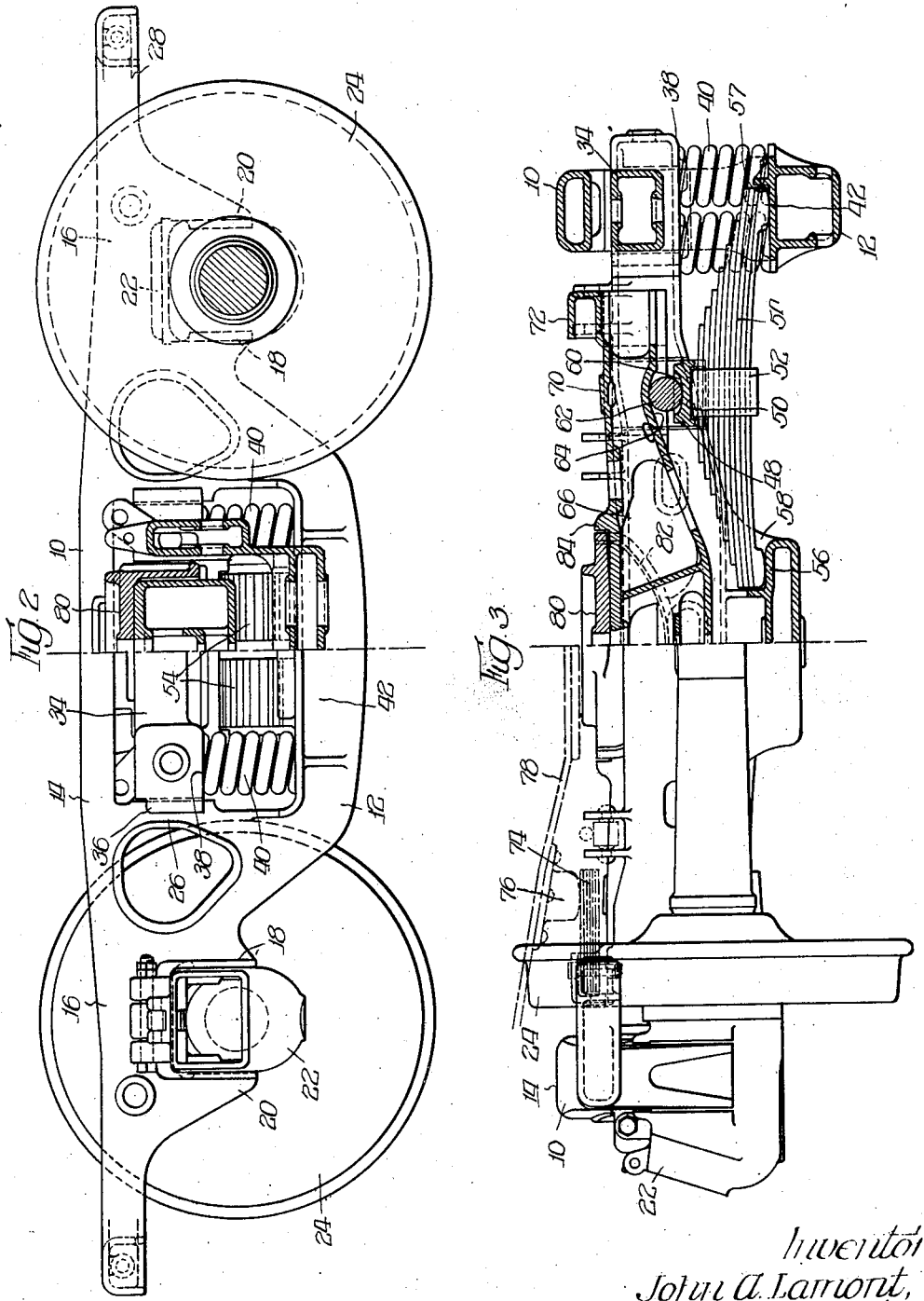

Patented Feb. 11, 1936

2,030,144

UNITED STATES PATENT OFFICE 2,030,144

TRUCK

John A. Lamont, Chicago, Ill., assignor to American Steel Foundries, Chicago, Ill., a corporation of New Jersey Application July 21, 1931, Serial No. 552,158

26 Claims. (Cl. 105—186)

This invention pertains to truck construction and more particularly to high speed four-wheel trucks.

In freight cars in general use today it is desired that as economical a construction as possible be provided, yet one which is reliable as well as of adequate strength. The riding qualities in freight cars have been of secondary consideration for the reason that until comparatively recently freight train speeds have been very low. With the increase in freight train speeds to a point where they are operating substantially on passenger train schedules there has been a necessity for providing an easier riding truck in order that the ladings will not be badly damaged. In passenger car trucks, of course, this can be accomplished as these trucks are designed primarily for safety and riding qualities, and cost is not a serious factor. On account of the cost of passenger car trucks the railroad companies hesitate to equip freight cars with them as this would make the cost of a freight car, considering its use, very excessive.

It is an object of this invention, therefore, to provide a truck which is inexpensive to make and maintain, is of sturdy character, yet one in which the riding qualities approximate those of a passenger truck of improved design.

Another object of this invention is to provide a truck wherein the weight disposition when the train is in motion will be such as to prevent derailments, and side roll of the car body will be reduced to a minimum.

A further object of this invention is to provide a high speed freight truck wherein the relative movement between certain of the parts thereof is effectively snubbed.

A yet further object of this invention is to provide a truck construction wherein the transom carries only substantially fifty percent of the load, and wherein this load is imparted at substantially the center of the transom.

Yet another object is to provide a car truck wherein there is marked economy in spring material, yet one which embodies good riding qualities for a truck of substantially any speed.

A different object is to provide a car truck wherein the springs are in series and wherein the springs are of a different fundamental period of vibration, the springs in the series being of such frequency that multiples thereof will not synchronize within the usual periods of operation.

A still different object is to provide a car truck wherein springs of different character are provided, certain of the springs operating to take the ordinary loads, other springs operating as shock absorbing or load stabilizing members, and also operating as equalizers, which cause dampening of oscillation of the first named springs.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck embodying the invention;

Figure 2 is a side elevation partly in section of the truck shown in Figure 1;

Figure 3 is a half end and half sectional elevation on the transverse center line of the truck shown in Figures 1 and 2.

In the truck construction contemplated any type of side frame 10 may be used. The side frame shown is of substantially the Vulcan type and includes the tension member 12, the compression member 14 merging adjacent the ends as at 16 to form pedestal jaws 18 and 20 for receiving the journal box 22 which may be of any desired construction cooperating with the wheel and axle assemblies 24 which may be of the friction type, Simplex type, or any other desired type. While the Vulcan type of side frame is shown, and while a separate journal box construction is shown cooperating with the pedestal jaws, it is of course understood that the integral journal box type of frame may be used, provided the characteristics to be later described are embodied.

The integral columns 26 are spaced apart a greater distance than is usual in the conventional type of Vulcan side frame in order to accommodate the special spring arrangement, and the side frame also is provided with extensions 28 adapted to accommodate brake hangers. The transom 30 extends between the side frames and includes spaced members 32 connected adjacent the ends thereof by the member 34, said member being provided with the column cooperating members 36 embracing the columns and slidably guiding the transom with respect to the side frame, the transom also serving to position the spaced side frames with respect to each other.

The spring seats 38 disposed adjacent the column guides 26 engage the spring nests 40 which serve to resiliently support the transom on the spring seat portion 42 of the tension member. The transom is provided with the bracket members 43 of integral or separate construction, said brackets being adapted to receive the clasp brake hangers for the inner brake shoes, and the transom members are provided with the guides 44 adapted to accommodate the guiding portions 46 of the roller seat 48. The flat under surface of the roller seat 48 engages the arcuate surface 50 of the spring band 52 of the leaf spring assemblies 54, the outer ends of the leaf spring assemblies 54 being arcuate and engaging the spring seat 42 of the tension member, said tension member being provided with a lug 57 for limiting outward movement of the leaf spring assembly 54.

The inner ends of the spring assembly 54 are likewise arcuate and engage a transversely extending spring seat 56 provided on the bracket 58 formed integral with the transom and connecting the spaced members 32 adjacent the longitudinal center line of the truck. The roller seat 48 is pocketed as at 60 for the reception of the roller 62, the roller 62 anti-frictionally engaging the arcuate pocket 64 provided on the bolster 66, thus forming a centering device for the bolster, transverse movement of the bolster being limited by means of the members 68 provided on the transom. The bolster may be of substantially the same type as that shown and described in application Serial No. 470,358, filed July 24, 1930, being provided with the stops 70 and the spring pockets 72 for the reception of the leaf springs or snubber springs 74 which act as side bearings for the side bearing members 76 of the car body 78. The car body is pivotally mounted on the rocking center plate 80 which is positioned by the skirts 82 and the lugs 84 on said center plate and bolster respectively.

With a truck of this type the foregoing advantages are realized, and it is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a truck, the combination of a side frame including tension and compression members and spaced column guides integrally connecting said tension and compression members, a transom extending into the opening formed by said guides, spaced coil springs resiliently supporting said transom on said tension member, a spring seat on said transom, a bolster disposed adjacent said transom, and a leaf spring supporting said bolster and engaging said tension member between said coil springs and engaging said spring seat.

2. In a truck, the combination of a side frame including tension and compression members and spaced column guides integrally connecting said tension and compression members, a transom cooperating with said column guides and including spaced members, resilient means supporting said transom on said tension member, and a bolster disposed between said spaced members and supported on said side frame and transom by resilient means directly supported on said side frame and transom.

3. In a truck, the combination of a side frame including tension and compression members and spaced column guides integrally connecting said tension and compression members, a transom cooperating with said column guides and including spaced members, resilient means supporting said transom on said tension member, and a bolster disposed between said spaced members and supported on said tension member and transom by resilient means directly supported on said tension member and transom.

4. In a truck, the combination of a side frame including tension and compression members, spaced column guides integrally connecting said tension and compression members, a transom having spaced members, said transom having portions engaging said column guides, resilient means between said portions and said tension member, and a bolster disposed between said spaced members and anti-frictionally supported on said side frame through a resilient member directly supported thereon.

5. In a truck, the combination of a side frame including tension and compression members, spaced column guides integrally connecting said tension and compression members, a transom having spaced members, said transom having portions engaging said column guides, resilient means between said portions and said tension member, and a bolster disposed between said spaced members and anti-frictionally supported on said side frame and transom through a resilient member directly supported thereon.

6. In a truck, the combination of a side frame including tension and compression members and spaced column guides integrally connecting said tension and compression members, a transom cooperating with said column guides and including spaced members, a coil spring supporting said transom on said tension member, and a bolster disposed between said spaced members and anti-frictionally supported on said side frame and transom through a resilient member directly supported thereon.

7. In a truck, the combination of a side frame including tension and compression members and spaced column guides integrally connecting said tension and compression members, a transom cooperating with said column guides and including spaced members, a coil spring supporting said transom on said tension member, and a bolster disposed between said spaced members and anti-frictionally and resiliently supported on said side frame by a leaf spring directly engaging said side frame.

8. In a truck, the combination of a side frame including tension and compression members and spaced column guides integrally connecting said tension and compression members, a transom cooperating with said column guides and including spaced members, a coil spring supporting said transom on said tension member, and a bolster disposed between said spaced members and anti-frictionally and resiliently supported on said side frame and transom by a leaf spring directly engaging said side frame and transom.

9. In a truck, the combination of a side frame including tension and compression members, spaced column guides integrally connecting said tension and compression members, a transom having spaced members, said transom having portions engaging said column guides, resilient means between said portions and said tension member, and a bolster disposed between said spaced members and anti-frictionally and resiliently supported on said side frame by a leaf spring directly engaging said side frame.

10. In a truck, the combination of a side frame including tension and compression members, spaced column guides integrally connecting said tension and compression members, a transom having spaced members, said transom having portions engaging said column guides, resilient means between said portions and said tension member, and a bolster disposed between said spaced members and anti-frictionally and resiliently supported on said side frame and transom by a leaf spring directly engaging said side frame and transom.

11. In a truck, the combination of a side frame including tension and compression members and spaced column guides integrally connecting said tension and compression members, a transom disposed between said column guides and including spaced members, resilient means supporting said transom on said tension member, and a bolster disposed between said spaced members and resiliently supported on said side frame and transom by a leaf spring directly engaging said side frame and transom.

12. In a truck, the combination of a side frame including tension and compression members and spaced column guides integrally connecting said tension and compression members, a transom disposed between said column guides and including spaced members, a coil spring supporting said transom on said tension member, and a bolster disposed between said spaced members and resiliently supported on said tension member and transom by a leaf spring directly engaging said side frame and transom.

13. A transom including spaced members, members connecting said spaced members adjacent the ends thereof and provided with a coil spring seat, and a seat member disposed between said spaced members intermediate said second named members, said seat member being disposed adjacent the transverse center line of said transom and provided with spaced leaf spring seats.

14. A transom including spaced members, members connecting said spaced members adjacent the ends thereof and provided with a coil spring seat and a seat member disposed between said spaced members intermediate said second named members, said seat member being disposed adjacent the transverse center line of said transom and provided with spaced spring seats.

15. A transom including spaced members, members connecting said spaced members adjacent the ends thereof and provided with a coil spring seat and a leaf spring seat member disposed between said spaced members intermediate said second named members and below said coil spring seat, said seat member being disposed adjacent the transverse center line of said transom and provided with spaced spring seats.

16. In a truck, the combination of a side frame including tension and compression members and spaced column guides integrally connecting said tension and compression members, a transom cooperating with said column guides and including spaced members, resilient means supporting said transom on said tension member, a bolster disposed between said spaced members and having an anti-friction member seat, a spring having a cap having an anti-friction member seat, an anti-friction member between said seats, said last named spring engaging said tension member and said transom, and cooperating guide means on said cap and transom.

17. A transom including spaced members, members connecting said spaced members adjacent the ends thereof and provided with a coil spring seat and a leaf spring seat member disposed between said spaced members intermediate said second named members and below said coil spring seat, said seat member being disposed adjacent the transverse center line of said transom and provided with spaced spring seats, said spaced members having guides for engaging roller spring seats.

18. In a truck, the combination of a side frame, a transom including spaced members, resilient means supporting said transom on said side frame, a bolster disposed between said spaced members and having an anti-friction member seat, a spring having a cap having an anti-friction member seat, an anti-friction member between said seats, said last named spring engaging said tension member and said transom, and cooperating guide means on said cap and transom.

19. In a truck, the combination of a side frame including tension and compression members and spaced column guides integrally connecting said tension and compression members, a transom cooperating with said column guides and including spaced members, resilient means supporting said transom on said tension member, and a bolster disposed between said spaced members and supported on said side frame and transom by resilient means directly supported on said side frame.

20. In a truck, the combination of a side frame including tension and compression members and spaced column guides integrally connecting said tension and compression members, a transom cooperating with said column guides and including spaced members, resilient means supporting said transom on said tension member, and a bolster disposed between said spaced members and supported on said tension member and transom by resilient means directly supported on said tension member.

21. In a car truck, the combination of a side frame, a transom resiliently supported on said side frame, a leaf spring fixedly supported on said side frame and transom, and a bolster supported on said leaf spring.

22. In a car truck, the combination of a side frame, a transom resiliently supported on said side frame, a leaf spring fixedly supported on said side frame and transom, lateral motion means carried by said leaf spring, and a bolster mounted on said lateral motion means.

23. In a car truck, the combination of a side frame, a transom resiliently supported on said side frame, a leaf spring engaging said side frame and transom and being supported thereby, lateral motion means carried by said leaf spring, and a bolster mounted on said lateral motion means.

24. In a car truck, the combination of a side frame including tension and compression members and integrally connecting columns forming a window therewith, a transom extending into said window and being movably supported on said tension member, a leaf spring engaging said transom and tension member and being supported thereby, and a bolster supported on said leaf spring.

25. In a car truck, the combination of a side frame including tension and compression members and integrally connecting columns forming a window therewith, a transom extending into said window and being resiliently supported on said tension member, a semi-elliptic leaf spring having one end mounted on said side frame and the other end mounted on said transom, and a bolster mounted on said leaf spring intermediate the ends thereof.

26. In a car truck, the combination of a side frame including tension and compression members and integrally connecting columns forming a window therewith, a transom extending into said window and being resiliently supported on said tension member, a leaf spring fixedly supported on said side frame and transom, and a bolster supported on said leaf spring.

JOHN A. LAMONT.